Patented Apr. 24, 1951

2,549,877

UNITED STATES PATENT OFFICE 2,549,877

PROCESS OF PRODUCING MAPLE SIRUP CONCENTRATE

Charles O. Willits, North Hills, and William L. Porter, Philadelphia, Pa., assignors to the United States of America as represented by the Secretary of Agriculture No Drawing. Application February 28, 1950, Serial No. 146,912

5 Claims. (Cl. 99—142)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of maple sirup concentrates by thermal treatment of maple sirup.

It has been proposed, heretofore, to enhance the flavor of maple products by heating maple sirup at a temperature in excess of its boiling point in a closed vessel. This method, however, wherein all the volatile components present in the original sirup, as well as those formed in the course of the treatment, are retained in contact with the sirup throughout the heating process, intensifies not only the maple aroma but also off-flavors, so that the thus treated sirup possesses a peculiar flavor that may be readily distinguished from true maple aroma.

We have found that the flavor of maple sirup can be greatly enhanced without undergoing any appreciable alteration of the flavoring character by raising the temperature of the sirup about 25° to 50° F., above the boiling point of water for a length of time sufficient to cause the desired development of flavor-imparting constituents while maintaining the sirup at atmospheric pressure under conditions such as to allow spontaneous dissipation of the more volatile products present or formed in the sirup without, however, causing any substantial increase of its solids content.

In accordance with the method of our invention a maple sirup produced by any conventional procedure and having the usual solids content of about 65 percent, is first concentrated by evaporation at atmospheric pressure until sufficient water has been removed to cause the boiling point of the residual, thickened sirup to be raised 25° to 50° F. above the temperature of boiling water. The resulting concentrated sirup is then maintained at this substantially constant temperature level by boiling at atmospheric pressure with continuous addition of water at a constant rate equal to vaporization rate of water from the boiling concentrated sirup. Addition of water is effected in the preferred form of our process by heating the concentrated sirup to the boiling temperature and passing the gaseous products emanating from the heated sirup into a surface condenser vented to the atmosphere and of sufficient capacity to condense substantially all the water vapor present in the vaporized portion of the sirup. The resulting liquid condensate is continuously returned to the boiling sirup, thereby maintaining its temperature and solids content substantially constant during the heating operation. This procedure is continued for a length of time necessary to attain the desired increase of flavor imparting constitutuents which is usually effected within 2 to 3 hours of heating. The resulting product on being combined with an amount of water equal to that removed from the original sirup in the course of the preliminary concentration step yields a sirup which is at least four-fold in both strength of flavor and color as compared with the original sirup, and which does not possess the undesirable off-flavors characteristic of maple sirup concentrates produced by previously proposed procedures.

The maple sirup concentrate obtained by our process may also be utilized as such for the production of cake sugar.

The following example is given as an illustrative embodiment of a manner in which our invention may be practiced.

One thousand grams of No. 2 maple sirup (U. S. Grade B) were placed into a 4-quart stainless steel beaker and heated with vigorous agitation until the temperature of the boiling sirup gradually increased from 219° F., to 245° F. The beaker was then covered with a vapor-tight lid provided with a stirring device, thermometer tube and fitted with a water cooled reflux condenser. The contents of the beaker were boiled under reflux and with agitation for 2 hours and 15 minutes during which time the temperature of the batch fluctuated within the range of 244.5° to 246° F. Water was then added, gradually and at such a rate as not to interrupt the boiling process, until the temperature of the boiling batch had been lowered to about 220° F. Heating was then discontinued and the batch allowed to cool, after which the solids content of the processed sirup was adjusted to 65.5 percent by addition of a small amount of water. The product so obtained meets U. S. specifications for density. The color and strength of flavor of the original sirup was increased four-fold in this concentrate which was substantially devoid of any adventitious off-flavors.

We claim:

1. The process of subjecting maple products to a heat treatment at atmospheric pressure which comprises evaporating maple sirup to form a residual concentrated sirup boiling about 25° to 50° F., above the boiling point of water and thereafter heating the concentrated sirup at boiling temperature, in the range 25° to 50° F. above the normal boiling point of water, for a length of time sufficient to enhance the flavor thereof, while continuously adding water at a rate such as to maintain substantially constant the boiling temperature of the concentrated sirup.

2. The process as defined by claim 1 wherein addition of water is effected by cooling the gaseous products evolved from the concentrated sirup, to condense substantially all the water vapor present therein, and continuously returning the resulting liquid condensate to the boiling concentrated sirup.

3. A process comprising evaporating at atmospheric pressure a maple sirup to form a residual concentrate boiling about 25-50° F., above the boiling point of water; heating the concentrate to boiling at atmospheric pressure, in the range 25° to 50° F. above the normal boiling point of water, subjecting the vapors to reflux condensation to condense the water vapor and continuously returning the reflux condensate to the boiling concentrate.

4. A process of enhancing the flavor of maple sirup, comprising boiling maple sirup concentrate without pressure, to distill off water and other volatile products, adding water to the boiling concentrate at a rate substantially that of the vaporization rate of the water, thereby causing the development of flavor-imparting constituents, and resulting in a product which, if combined with an amount of water equal to that removed from the maple sirup in the course of preliminary concentration, yields a sirup which is several fold in strength of flavor and color as compared with the original sirup.

5. A process of developing flavor imparting impurities in maple sirup concentrate comprising boiling the concentrate for several hours, without pressure, water being added during the boiling to replenish that boiled off.

CHARLES O. WILLITS.
WILLIAM L. PORTER.

REFERENCES CITED

The following references are of record in the file of this patent:

UNITED STATES PATENTS

| Number | Name | Date |
|---|---|---|
| 2,054,873 | Whitby | Sept. 22, 1936 |
| 2,237,981 | Ellis et al. | Apr. 8, 1941 |